US011770705B2

(12) United States Patent
Sandu et al.

(10) Patent No.: US 11,770,705 B2
(45) Date of Patent: *Sep. 26, 2023

(54) MOBILE DEVICE TOOLS FOR AUTHENTICATED SMART VEHICLE PAIRING AND WIRELESS ROUTING CONFIGURATION AND METHODS OF USE

(71) Applicant: Thor Tech Inc., Elkhart, IN (US)

(72) Inventors: Ciprian R. Sandu, Coppell, TX (US); Jason T. Kriesel, Grand Prairie, TX (US); McKay R. Featherstone, Tipp City, OH (US); Edward Brady, Delaware, OH (US); Steven Hileman, Coldwater, OH (US)

(73) Assignee: Thor Tech, Inc., Elkhart, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/471,605

(22) Filed: Sep. 10, 2021

(65) Prior Publication Data
US 2021/0409946 A1   Dec. 30, 2021

Related U.S. Application Data

(63) Continuation of application No. 16/751,604, filed on Jan. 24, 2020, now Pat. No. 11,146,955.
(Continued)

(51) Int. Cl.
*H04W 12/06* (2021.01)
*H04L 9/40* (2022.01)
(Continued)

(52) U.S. Cl.
CPC ......... *H04W 12/06* (2013.01); *H04L 63/0823* (2013.01); *H04L 63/0853* (2013.01);
(Continued)

(58) Field of Classification Search
CPC ..... H04W 4/80; H04W 12/06; H04W 12/003; H04W 12/068; H04W 12/069;
(Continued)

(56) References Cited

U.S. PATENT DOCUMENTS 9,171,268 B1    10/2015   Penilla et al.
10,493,955 B1 * 12/2019   Chen ................. H04W 12/50
(Continued)

FOREIGN PATENT DOCUMENTS

KR       101933493 B1    12/2018
WO       2017106224 A1    6/2017

OTHER PUBLICATIONS

U.S. Appl. No. 16/751,604, filed Jan. 24, 2020, Ciprian R. Sandu.
International Search Report and Written Opinion dated Apr. 9, 2020 relating to International Application No. PCT/US/2020/014880.
(Continued)

*Primary Examiner* — Quoc Thai N Vu
(74) *Attorney, Agent, or Firm* — Dinsmore & Shohl LLP (57) ABSTRACT

Configuration methods and systems include a smart vehicle router associated with router information stored in a router file in a cloud network, and a smart mobile device comprising a camera and software application tool. The router information includes a unique authentication certificate to permit a one-to-one pairing such that another pairing is not available. The configuration system is configured to read an image of an identification component associated with the smart vehicle router and the router information, apply an authentication algorithm to the image to provision the tool with the unique authentication certificate, authenticate the smart vehicle based on the image and authentication algorithm, pair the authenticated smart vehicle with the tool in the one-to-one pairing based on the unique authentication certificate and the router information, and automatically
(Continued)

configure the tool on the smart mobile device to retrieve data associated with the authenticated smart vehicle.

20 Claims, 9 Drawing Sheets

Related U.S. Application Data (60) Provisional application No. 62/796,685, filed on Jan. 25, 2019.

(51) Int. Cl.
*H04W 12/40* (2021.01)
*H04W 12/50* (2021.01)

(52) U.S. Cl.
CPC ......... *H04L 63/0876* (2013.01); *H04W 12/40* (2021.01); *H04W 12/50* (2021.01)

(58) Field of Classification Search
CPC ............... H04W 12/0609; H04W 4/40; H04W 12/40; H04W 12/50; H04W 12/0023; H04W 12/00403; H04W 12/77; H04W 4/44; H04W 4/48; H04W 76/14; H04L 63/0823; H04L 63/0838; H04L 63/0853; H04L 63/0876; H04L 63/0884; H04L 2209/84; B60R 2325/205; B60R 2325/101; B60R 25/241; G06F 16/9554; G06F 21/44; G06F 21/36; G06Q 30/0645
See application file for complete search history.

(56) References Cited

U.S. PATENT DOCUMENTS

| | | |
|---|---|---|
| 2004/0003231 A1* | 1/2004 | Levenson ........... B60R 16/0234 713/155 |
| 2014/0225724 A1 | 8/2014 | Rankin et al. |
| 2015/0024686 A1 | 1/2015 | Hrabak |
| 2016/0197772 A1 | 7/2016 | Britt et al. |
| 2016/0297398 A1 | 10/2016 | Jefferies |
| 2017/0178035 A1 | 6/2017 | Grimm |
| 2017/0366969 A1 | 12/2017 | Syed |
| 2018/0108194 A1 | 4/2018 | Link, II |
| 2018/0154874 A1 | 6/2018 | Kulkarni et al. |
| 2018/0367329 A1 | 12/2018 | Shin |
| 2019/0020718 A1 | 1/2019 | Mathews et al. |
| 2019/0274015 A1 | 9/2019 | Sumilla et al. |
| 2020/0201959 A1* | 6/2020 | Takemori .............. H04L 9/3213 |

OTHER PUBLICATIONS

International Search Report and Written Opinion dated Jun. 23, 2020 pertaining to International application No. PCT/US2020/014970 filed Jan. 24, 2020, 22 pgs.

International Search Report and Written Opinion dated Apr. 9, 2020 pertaining to International application No. PCT/US2020/014944 filed Jan. 24, 2020, 17 pgs.

CA Examiner Requisition dated Nov. 10, 2022 pertaining to CA application No. 3,127,454 filed Jul. 21, 2021, pp. 1-4.

* cited by examiner

MOBILE DEVICE TOOLS FOR AUTHENTICATED SMART VEHICLE PAIRING AND WIRELESS ROUTING CONFIGURATION AND METHODS OF USE

CROSS-REFERENCE TO RELATED APPLICATIONS

The present specification is a continuation of U.S. Non-Provisional application Ser. No. 16/751,604, filed Jan. 24, 2020, which claims priority to U.S. Provisional App. No. 62/796,685, filed Jan. 25, 2019, each entitled "MOBILE DEVICE TOOLS FOR AUTHENTICATED SMART VEHICLE PAIRING AND WIRELESS ROUTING CONFIGURATION AND METHODS OF USE," the entireties of which are incorporated by reference herein.

TECHNICAL FIELD

The present specification generally relates to systems to configure a router associated with a smart vehicle with wireless routing functionality and, more specifically, to smart vehicle configuration systems to pair the router and smart vehicle with a smart mobile device and methods of use of such systems.

BACKGROUND

A mobile device may include software to pair with another device. Such software often requires user interaction to select a desired device from a list and to manually provide additional input prior to device pairing. However, manual selection and user input may disjoint the process and lead to potential human error due to an incorrect selection of the device from the list.

Accordingly, a need exists for alternative systems to configure and pair devices and methods of use of such systems.

SUMMARY

In one embodiment, a configuration system comprises a cloud network, a smart vehicle router associated with router information stored in a router file for the smart vehicle router in the cloud network, a smart mobile device comprising a camera and a software application tool, a processor communicatively coupled to the smart mobile device, a memory communicatively coupled to the processor, and machine readable instructions stored in the memory. The router information includes a unique authentication certificate configured to permit a one-to-one pairing such that another pairing is not available. The machine readable instructions cause the configuration system to perform at least the following when executed by the processor: read an image of an identification component associated with the smart vehicle router of a smart vehicle using the camera and the software application tool of the smart mobile device, the identification component associated with the router information stored in the router file, and apply an authentication algorithm to the image of the identification component, the authentication algorithm configured to provision the software application tool with the unique authentication certificate from the cloud network. The machine readable instructions further cause the configuration system to perform at least the following when executed by the processor: authenticate the smart vehicle as an authenticated smart vehicle based on the image of the identification component and the authentication algorithm, pair the authenticated smart vehicle with the software application tool in the one-to-one pairing based on the unique authentication certificate and the router information, and automatically configure the software application tool on the smart mobile device to retrieve data associated with the authenticated smart vehicle.

In another embodiment, a configuration system comprises a cloud network, a smart vehicle router associated with router information stored in a router file for the smart vehicle router in the cloud network, the router information including a unique authentication certificate configured to permit a one-to-one pairing such that another pairing is not available, a smart mobile device comprising a camera and a software application tool, a processor communicatively coupled to the smart mobile device, a memory communicatively coupled to the processor, and machine readable instructions stored in the memory. The machine readable instructions cause the configuration system to perform at least the following when executed by the processor: read an image of an identification component associated with the smart vehicle router of a smart vehicle using the camera and the software application tool of the smart mobile device, the identification component associated with the router information stored in the router file, apply an authentication algorithm to the image of the identification component, the authentication algorithm configured to provision the software application tool with the unique authentication certificate from the cloud network, and authenticate the smart vehicle as an authenticated smart vehicle based on the image of the identification component and the authentication algorithm. The machine readable instructions further cause the configuration system to perform at least the following when executed by the processor: pair the authenticated smart vehicle with the software application tool in the one-to-one pairing based on the unique authentication certificate and the router information, automatically configure the software application tool on the smart mobile device to retrieve data associated with the authenticated smart vehicle, and control the IOT controller of the authenticated smart vehicle and the wireless routing of the authenticated smart vehicle through the software application tool paired with the authenticated smart vehicle.

In one other embodiment is a method to pair a smart vehicle and a software application tool of a smart mobile device. The smart mobile device comprising a camera and communicatively coupled to a cloud network, and the smart vehicle comprising a smart vehicle router associated with router information stored in a router file for the smart vehicle router in the cloud network, the router information including a unique authentication certificate configured to permit a one-to-one pairing such that another pairing is not available. The method comprises reading an image of an identification component associated with the smart vehicle router of the smart vehicle using the camera and the software application tool of the smart mobile device, the identification component associated with the router information stored in the router file, applying an authentication algorithm to the image of the identification component, the authentication algorithm configured to provision the software application tool with the unique authentication certificate from the cloud network, and authenticating the smart vehicle as an authenticated smart vehicle based on the image of the identification component and the authentication algorithm. The method further comprises pairing the authenticated smart vehicle with the software application tool in the one-to-one pairing based on the unique authentication certificate and the router information, and automatically configuring the software application tool on the smart mobile device to retrieve data associated with the authenticated smart vehicle.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Referring generally to the figures, embodiments of the present disclosure are directed to systems and methods for configuration and pairing of mobile device tools and, in particular, for wireless routing configuration and authenticated smart vehicle pairing.

The configuration systems described herein streamline a process to configure a router to associate with a smart vehicle and select the associated smart vehicle to more efficiently and accurately pair with a smart mobile device by not requiring manual user selection, for example, of the smart vehicle from a listing of options presented to the user. Additionally, removing user-based selection steps that would require additional processing steps reduces an amount of processing time along with reducing a potential of human error, thereby increasing and improving processing speed and accuracy of the systems described herein.

Reference will now be made in detail to embodiments of the configuration systems, and examples of such systems are illustrated in the accompanying drawings. Wherever possible, the same reference numerals will be used throughout the drawings to refer to the same or like parts. Various embodiments of the configuration systems will be described in further detail herein with specific reference to the appended drawings.

Figure 1:
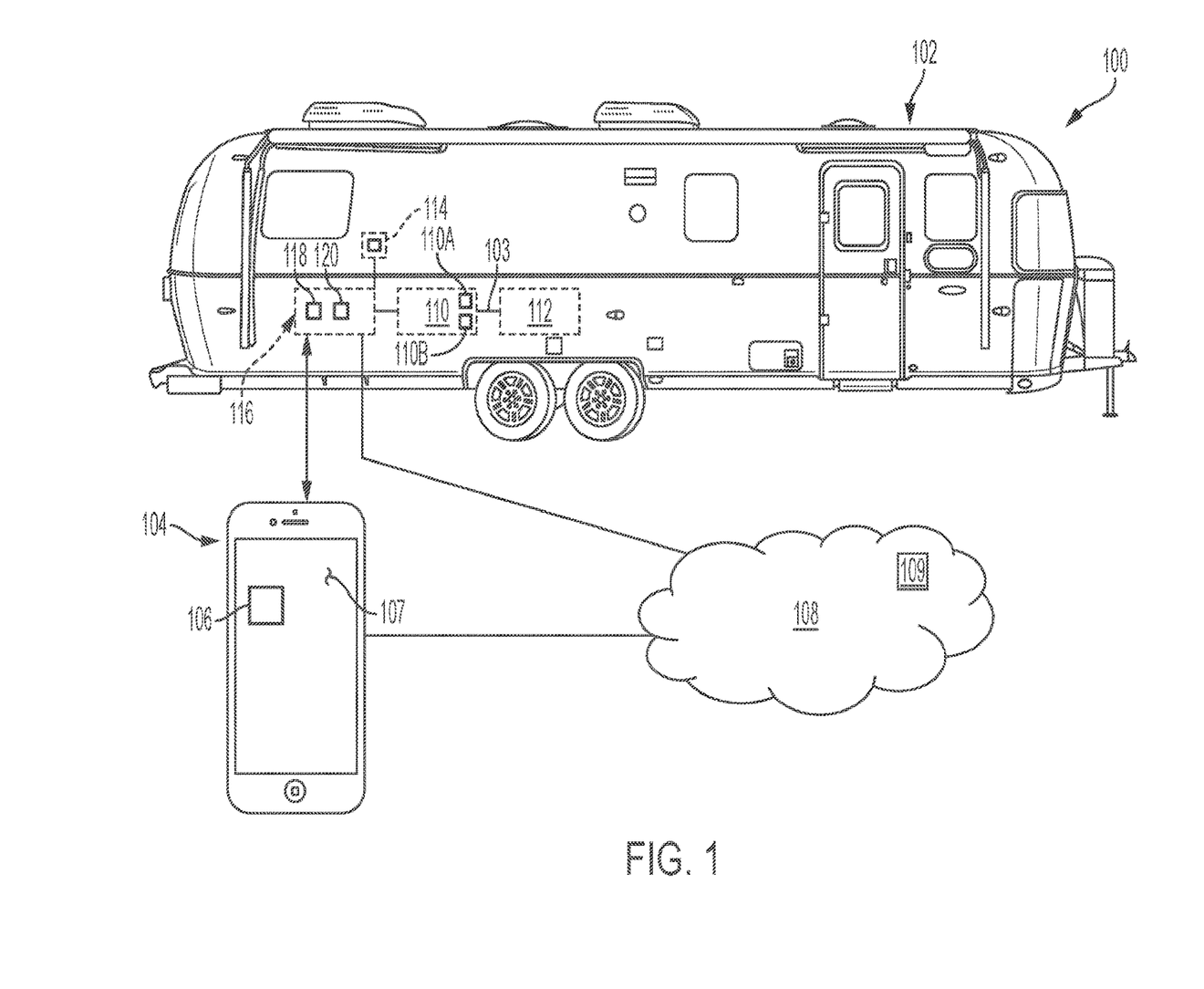
FIG. 1 schematically illustrates a system for implementing computer and software based methods to utilize a configuration system to configure and pair a router of a smart vehicle with a smart mobile device, according to one or more embodiments shown and described herein.

Referring to FIG. 1, a configuration system 100 includes a smart vehicle 102. The smart vehicle 102 may be a recreational vehicle (RV), such as ones commercially available through AIRSTREAM, Inc. of Jackson Center, Ohio. Further, the configuration system 100 includes a router 116, one or more processors 110 communicatively coupled to the router 116, and a memory 112 communicatively coupled to the one or more processors 110. The router 116 may be configured for the smart vehicle 102 as described in greater detail below such that the router 116 is installed within and associated with the smart vehicle 102. The router 116 includes a first identification card 118 and a second identification card 120, as described in greater detail further below.

The configuration system 100 includes machine readable instructions stored in the memory 112 that cause the configuration system 100 to perform one or more of instructions when executed by the one or more processors 110. In at least one embodiment, and as described in greater detail below with respect to a process 200 of FIG. 2, and/or a process 300 of FIG. 3, which may be implemented by a processor 110 of FIG. 1, a method of operating or utilizing a configuration system 100 may include programming logic such as set forth in at least one of the process 200 and the process 300.

The configuration system 100 includes a smart mobile device 104 configured to be paired with the smart vehicle 102 as described in greater detail below. A graphical user interface (GUI) is disposed on and as part of the display screen 107 of the smart mobile device 104 and is communicatively coupled to and controlled by a software application tool 106 configured to pair with, monitor, and control one or more functionalities of the smart vehicle 102. The smart mobile device 104 may be a smartphone, a tablet, or a like portable handheld smart device. As a non-limiting example, the smart mobile device 104 may be a smartphone such as the iPHONE or a tablet such as the iPAD, both of which are commercially available from Apple, Inc. of Cupertino, Calif. The smart mobile device 104 includes a camera, a processor, a memory communicatively coupled to the processor, and machine readable instructions stored in the memory. The machine readable instructions may cause the configuration system to, when executed by the processor, launch and operate the software application tool 106 on the smart mobile device 104. The machine readable instructions may cause the configuration system to, when executed by the processor, use the functionality provided by the software application tool 106 to follow one or more control schemes as set forth in the one or more processes described herein.

Thus, smart mobile device 104 may configured to be communicatively coupled to the smart vehicle 102. As an example and not a limitation, the machine readable instructions may include instructions to pair the smart mobile device 104 and the smart vehicle 102. The machine readable instructions may further include instructions to automatically provide device specific pairing instructional information to a user regarding pairing prior to pairing the smart mobile device 104 and the smart vehicle 102.

Figure 2:
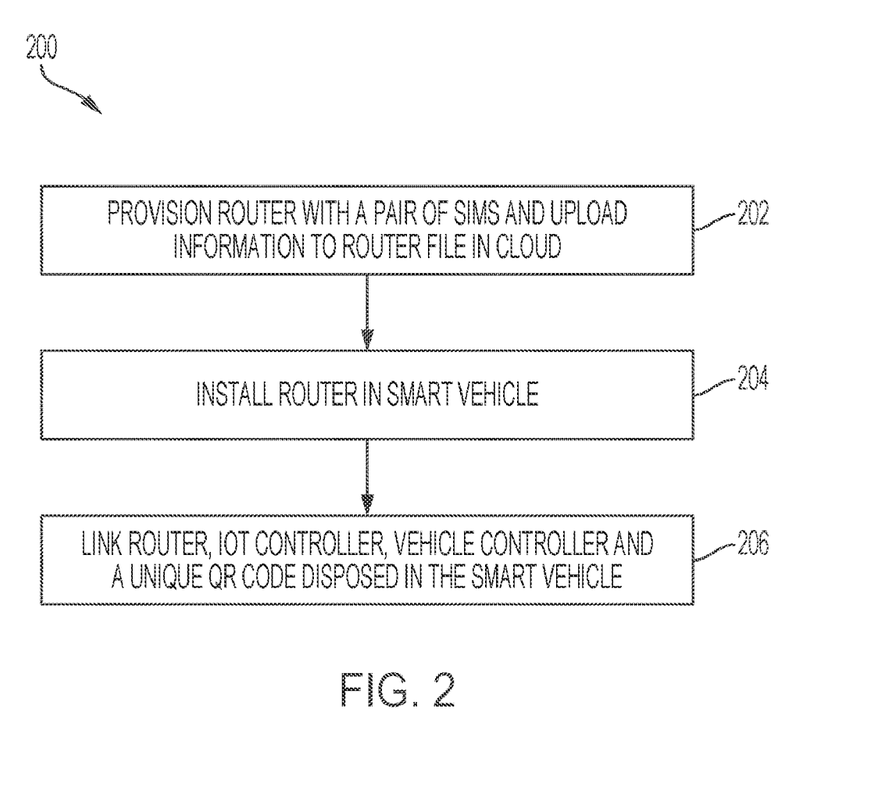
FIG. 2 is a flow chart of a process for using the configuration system of FIG. 1 to configure the router for wireless routing and association with the smart vehicle, according to one or more embodiments shown and described herein
Figure 3:
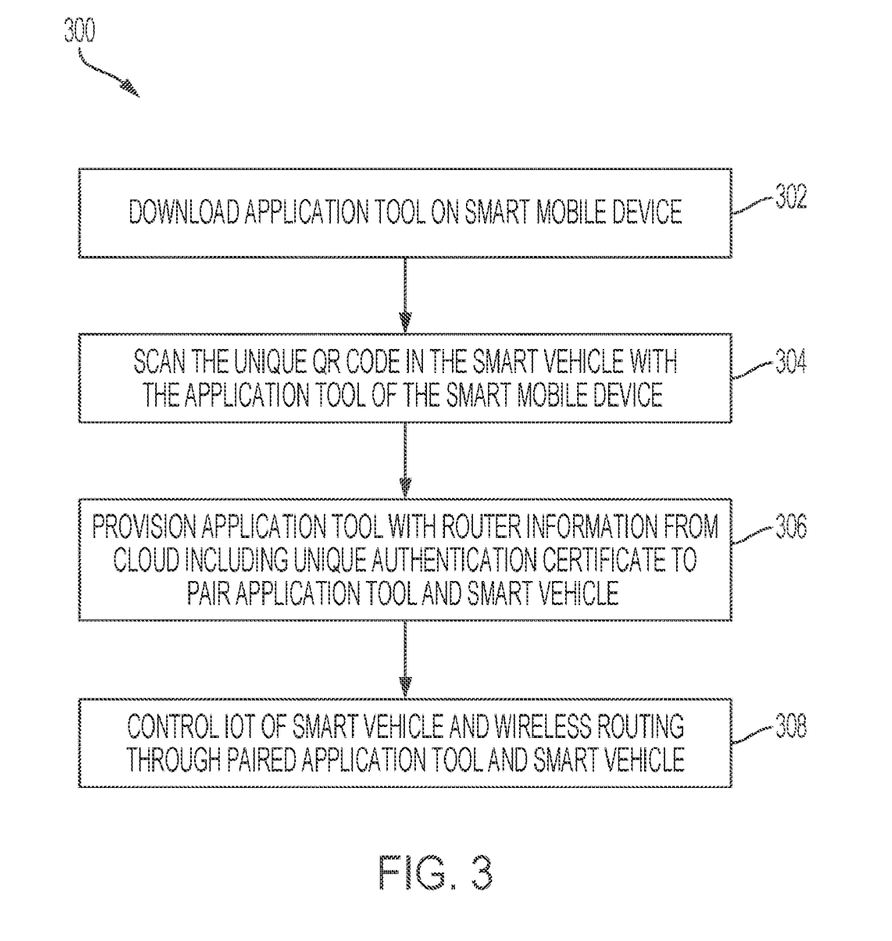
FIG. 3 is a flow chart of a process for using the configuration system of FIG. 1 to pair the router associated with the smart vehicle with the smart mobile device, according to one or more embodiments shown and described herein.

Referring to FIGS. 1-3, a configuration system 100 for implementing a computer and software-based method to configure the router 116 associated with the smart vehicle 102 (FIG. 2) and pair a smart mobile device 104 with the smart vehicle 102 (FIG. 3) is illustrated and may be implemented through use of the GUI of the smart mobile device 104, for example. The system 100 further includes a communication path 103 communicatively coupled to the one or more processors 110, the memory 112, network interface hardware such as the router 116, and an identification component 114. The identification component may be, for example, a unique QR code associated with the smart vehicle 102. The system may further include a storage or database, a network 108, and one or more servers 109.

In some embodiments, the system 100 is implemented using a local area network (LAN) or wide area network (WAN) as the network 108, such as an intranet or the Internet, or other wired or wireless communication network that may include a cloud computing-based network configuration.

As noted above, the system 100 includes the communication path 103 to communicatively couple the system components. The communication path 103 may be formed from any medium that is capable of transmitting a signal such as, for example, conductive wires, conductive traces, optical waveguides, or the like, or from a combination of mediums capable of transmitting signals. The communication path 103 communicatively couples the various components of the system 100. As used herein, the term "communicatively coupled" means that coupled components are capable of exchanging data signals with one another such as, for example, electrical signals via conductive medium, electromagnetic signals via air, optical signals via optical waveguides, and the like.

As noted above, the system 100 includes the one or more processors 110. The one or more processors 110 can be any device capable of executing machine readable instructions. Accordingly, the processor 110 may be a controller, an integrated circuit, a microchip, a computer, or any other computing device. The one or more processors 110 may include an internet of things ("IOT") controller 110A and/or a vehicle controller 110B to control and exchange information regarding one or more vehicle functionalities. By way of example, and not as a limitation, sensors configured to detect water levels within the smart vehicle 102 may communicate such information to IOT controller 110A and/or a vehicle controller 110B. The identification component 114 may be associated with the smart vehicle 102 such that information regarding the association is sent to the network 108 (e.g., the cloud) through the controller interface and stored in the cloud, including, for example, the vehicle identification number (VIN) of the smart vehicle 102 and information regarding the IOT controller 110A. Scanning of the identification component 114, as described in greater detail further below, may then be able to provide access to the associated smart vehicle 102 information stored in the cloud.

The IOT controller 110A is configured to connect, interact with, and exchange data between the vehicle subsystems through an interface control. By way of example, and not as a limitation, the IOT controller 110A may be a CZone controller as commercially available by Power Products, LLC of Menomonee Falls, Wis. The CZone controller is configured to replace one or more hard wired switch and fuse panels with networked digital switch interfaces to provide control of onboard electrical systems through an intelligent management system. The CZone controller may combine multiple circuits through a mode selection functionality and monitor vehicle systems and components while retaining control over specific circuits and functionality. The CZone controller is configured to provide the user with an interface able to provide such monitoring and control functionality, such as for power management automation.

Further, the vehicle controller 110B is configured to connect, interact with, and exchange data between various vehicle subsystems. The vehicle controller 110B may be a vehicle control area network bus ("CAN bus") controller. The CAN bus controller incorporates a robust vehicle bus standard to allow microcontrollers and vehicle devices to communicate within the vehicle systems without a host computer. The CAN bus controller incorporates a message-based protocol that cooperates with multiplex electrical wiring within the smart vehicle 102. Further, the CAN bus controller is configured to permit interaction between various vehicle systems to allow for a wide range of functionality and control through use of software rather than hard wiring between such systems. By way of example, and not as a limitation, a vehicle subsystem may control actuators or receive feedback from sensors through the CAN bus controller to control a vehicle's functionality. The CAN bus is configured to collate various sensor inputs from one or more different vehicle subsystems as needed to determine whether to enact a vehicle functionality of the vehicle subsystem based on those sensor inputs.

The one or more processors 110 are communicatively coupled to the other components of the system 100 by the communication path 103. Accordingly, the communication path 103 may communicatively couple any number of processors with one another, and allow the modules coupled to the communication path 103 to operate in a distributed computing environment. Specifically, each of the modules can operate as a node that may send and/or receive data. The one or more processors 110 may process the input signals received from the system modules and/or extract information from such signals.

As noted above, the system 100 includes the memory 112 which is coupled to the communication path 103 and communicatively coupled to the one or more processors 110. The memory 112 may be a non-transitory computer readable medium or non-transitory computer readable memory and may be configured as a nonvolatile computer readable medium. The memory 112 may comprise RAM, ROM, flash memories, hard drives, or any device capable of storing machine readable instructions such that the machine readable instructions can be accessed and executed by the one or more processors 110. The machine readable instructions may comprise logic or algorithm(s) written in any programming language such as, for example, machine language that may be directly executed by the processor, or assembly language, object-oriented programming (OOP), scripting languages, microcode, etc., that may be compiled or assembled into machine readable instructions and stored on the memory 112. Alternatively, the machine readable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components. In embodiments, the system 100 may include the one or more processors 110 communicatively coupled to the memory 112 that stores instructions that, when executed by the one or more processors 110, cause the processor to perform one or more functions as described herein.

Still referring to FIG. 1, as noted above, the system 100 comprises a smart mobile device 104 that includes a screen 107 configured to display a GUI of a smart vehicle software application tool 106 accessible by the smart mobile device 104 for providing visual output such as, for example, information, graphical reports, messages, or a combination thereof. The smart mobile devices may include smartphones, tablets, laptops, and/or the like. After pairing, the communication path 103 communicatively couples the smart vehicle software application tool 106 to other modules of the system 100. The screen 107 can include any medium capable of transmitting an optical output such as, for example, a cathode ray tube, light emitting diodes, a liquid crystal display, a plasma display, or the like.

The system 100 includes the network interface hardware for communicatively coupling the system 100 with a computer, cloud, and/or cellular network such as network 108. The network interface hardware may include, for example, the router 116 coupled to the communication path 103 and other modules of the system 100. The network interface hardware can be any device capable of transmitting and/or receiving data via a wireless network. Accordingly, the network interface hardware can include a communication transceiver for sending and/or receiving data according to any wireless communication standard. For example, the network interface hardware can include a chipset (e.g., antenna, processors, machine readable instructions, etc.) to communicate over wired and/or wireless computer networks such as, for example, wireless fidelity (Wi-Fi), WiMax, Bluetooth, IrDA, Wireless USB, Z-Wave, ZigBee, or the like.

The network 108 can include any wired and/or wireless network such as, for example, local area networks, wide area networks, metropolitan area networks, the Internet, an Intranet, the cloud, satellite networks, or the like. Accordingly, the network 108 can be utilized as a wireless access point by the smart vehicle 102 and/or smart mobile device 104 to access one or more servers 109. The one or more servers 109 may include a cloud server and generally include processors, memory, and chipset for delivering resources via the network 108. Resources can include providing, for example, processing, storage, software, and information from the one or more server 109 to the system 100 via the network 108. Additionally, it is noted that the one or more servers 109 can share resources with one another over the network 108 such as, for example, via the wired portion of the network, the wireless portion of the network, or combinations thereof.

Still referring to FIG. 1, data from various applications running on the one or more processors 110 can be provided from the smart vehicle 102 to the system 100 via the router 116. The smart vehicle 102 may include or be coupled to one or more computers communicatively coupled with the one or more processors 110, which computers can be any device having hardware (e.g., chipsets, processors, memory, etc.) for communicatively coupling with the router 116 and the network 108. Specifically, the computers can include an input device having an antenna for communicating over one or more of the wireless computer networks described above. Such a computer may include the smart mobile device 104 after pairing with the router 116 as described herein.

The router 116 includes a first identification card 118 and a second identification card 120. The first and second identification cards 118, 120 may be a pair of subscriber identity module (SIM) cards, or SIMS, each of which is an integrated circuit that securely stores an international mobile subscriber identity (IMSI) number and related key information used to identify and authenticate subscribers of smart mobile telephony devices. Each SIM card may also store contact information. Each SIM card may also store its own unique serial number as an integrated circuit card identifier (ICCID), the IMSI number, security authentication and ciphering information, local network related temporary information, a list of accessible user services, a user password as a personal identification number (PIN), and a personal unblocking code to unlock the PIN. A card services provider may be able to identify and authenticate a SIM card to provide services, such as cellular and/or wireless data services to a device within which the SIM card is installed.

The first identification card 118 is configured for operation with IOT control of the vehicle, such as for association with the IOT controller 110A to provide technology information and/or telemetry information to, for example, the cloud for a card services provider and/or permitted users of the first identification card 118. By way of example, and not as a limitation, such telemetry information includes vehicle data of the smart vehicle 102 that is sent to the cloud for monitoring and/or tracking purposes with respect to the smart vehicle 102. For example, submission of such data from a variety of smart vehicles 102 may permit monitoring and/or tracking of vehicle information across a fleet of vehicles and an associated ease and efficiency of fleet management. The second identification card 120 is configured to operate as an authenticated access point to provide wireless data services from the card services provider.

Wireless Routing Configuration

Referring to FIG. 2, the router 116 is configured for wireless routing and association with the smart vehicle 102 through the process 200. In block 202, the router 116 is first provisioned with the first identification card 118 and the second identification card 120. Thus, the first identification card 118 and the second identification card 120 are installed within the router 116. Information is then transmitted through the first identification card 118 and the second identification card 120 to be uploaded through a configuration tool to a router file in the network 108 (e.g., the cloud). Such information may include router information and information regarding the first identification card 118 and the second identification card 120, such as serial numbers and other identifying information. Such information stored in the cloud may be accessible by an application programming interface (API), as may be provided by the card services provider.

In block 204, the router 116 is installed in the smart vehicle 102. For example, the router 116 may be provisioned with the first identification card 118 and the second identification card 120 separately from manufacture of the smart vehicle 102. Thus, the router is not initially provisioned with information for a specific vehicle. In block 204, after vehicle manufacture, for instance, the router 116 as provisioned may be installed in the smart vehicle 102.

In block 206, the router 116, IOT controller 110A, vehicle controller 110B, and identification component 114 may be linked and communicatively coupled to connect, interact with, and exchange data between each other. The identification component 114 is thus associated with the router 116 and the router file in the cloud to further provide vehicle specific information about the associated smart vehicle 102 within which the router 116 is installed to the cloud. The identification component 114 may be a unique quick response ("QR") code configured to act as a digital key to identify the associated smart vehicle 102. For example, the QR code as the identification component 114 is a unique matrix barcode that includes a machine readable optical label containing information about the smart vehicle 102. Thus, associating the identification component 114 with the router 116 sends information such as the unique QR code to the router file in the cloud. Additionally sent information may include the vehicle identification number (VIN) of the smart vehicle 102 and information regarding the IOT controller 110A.

Pairing

Referring to FIG. 3, a process 300 depicts the pairing between a smart mobile device 104 and the smart vehicle 102 configured through the process 200. Reference to the screenshots of FIGS. 4-8 will be made along with associated blocks of the process 300 to describe the authenticated pairing between the smart mobile device 104 and the smart vehicle 102.

Figure 4:
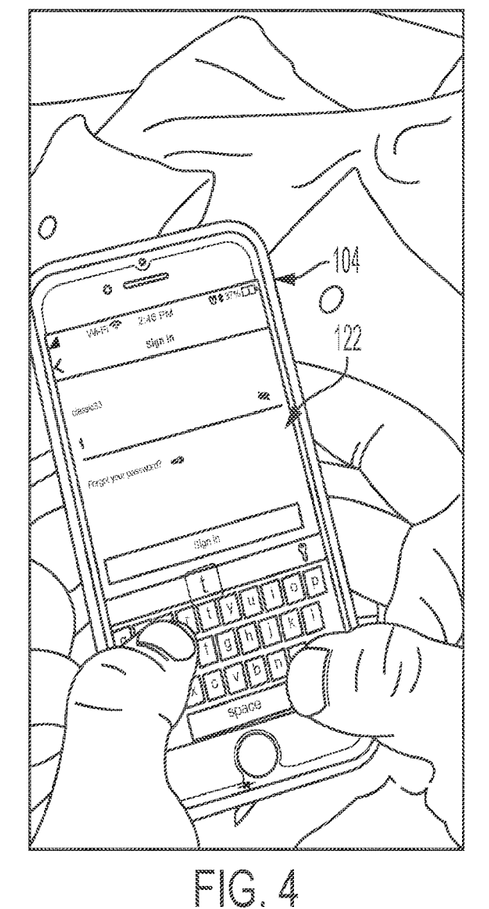
FIG. 4 is a view of a graphical user interface (GUI) of a smart mobile device showing a login screen of a smart vehicle software application tool accessible by the smart mobile device, according to one or more embodiments shown and described herein.
Figure 5:
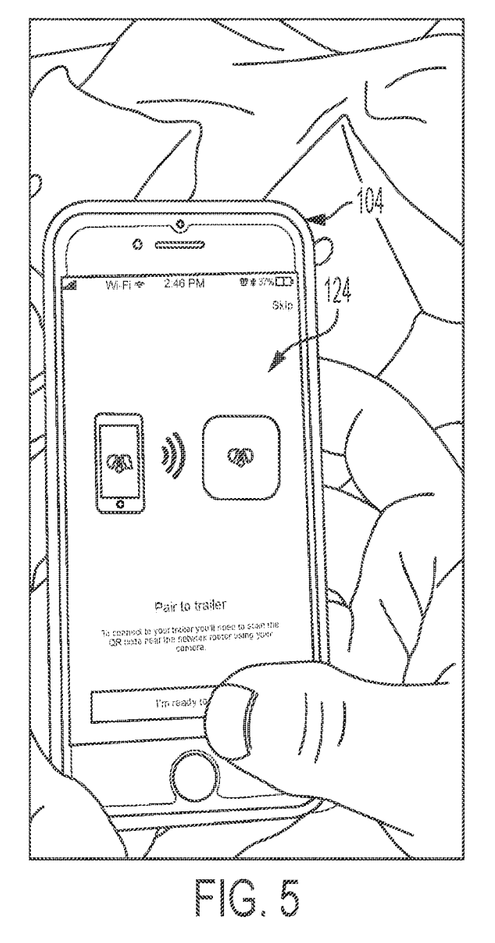
FIG. 5 is a view of the GUI of the smart mobile device showing a pair activation screen of the smart vehicle software application tool, according to one or more embodiments shown and described herein.

In block 302, the software application tool 106 is downloaded onto the smart mobile device 104. Once the software application tool 106 is downloaded to the smart mobile device 104, a user may create an account and/or login to a unique user account on the software application tool 106. As a non-limiting example, FIG. 4 depicts a login screen 122 of the software application tool 106 of the smart mobile device 104. The user may initiate the pairing process by selecting a pair button option on the software application tool 106. For example, FIG. 5 depicts a pair activation screen 124 of the software application tool 106 of the smart mobile device 104 including a ready to pair indicator button. The pair activation screen 124 may include further instructional pairing information, such as advising the user that to pair to the smart vehicle 102, the user will need to scan the identification component 114 (such as the unique QR code) that may be located near the router 116 using a camera of the smart mobile device 104. Reading of the image of the identification component 114 as described herein thus may comprise scanning of the unique QR code.

Figure 6:
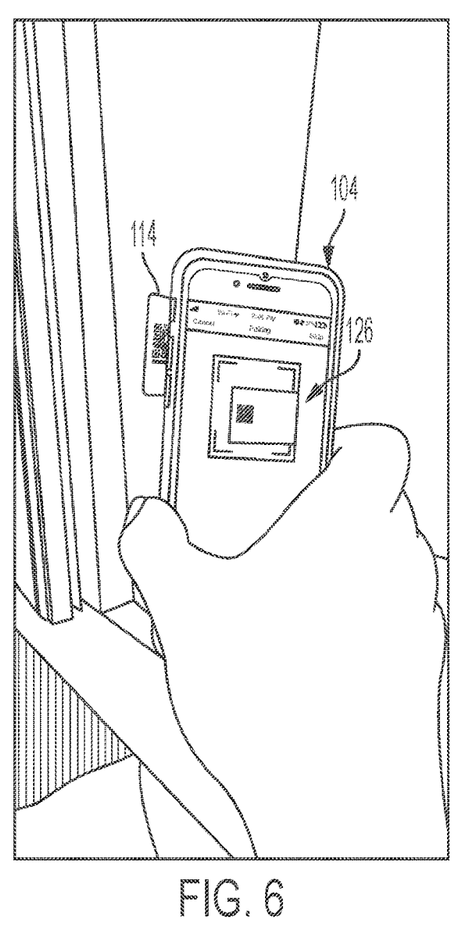
FIG. 6 is a view of the GUI of the smart mobile device showing a code capture screen of the smart vehicle software application tool, according to one or more embodiments shown and described herein.

In block 304, the identification component 114 in the smart vehicle 102 is scanned by the software application tool 106 on the smart mobile device 104. FIG. 6 depicts a code capture screen 126 of the software application tool 106 to capture an image of the identification component 114 by a camera on the smart mobile device 104. As a non-limiting example, the identification component 114 is a unique QR code, and scanning of the unique QR code associates the smart vehicle 102 with the user account on the software application tool 106. The QR code further is configured to act as an alphanumeric code to pair the user account on the software application tool 106 with the smart vehicle 102 in a one-to-one pairing such that no other user account may then be paired with the smart vehicle 102 after pairing completion and prior to pairing timeout. For example, the one-to-one pairing with the unique user account may expire upon a pairing timeout period.

Figure 7:
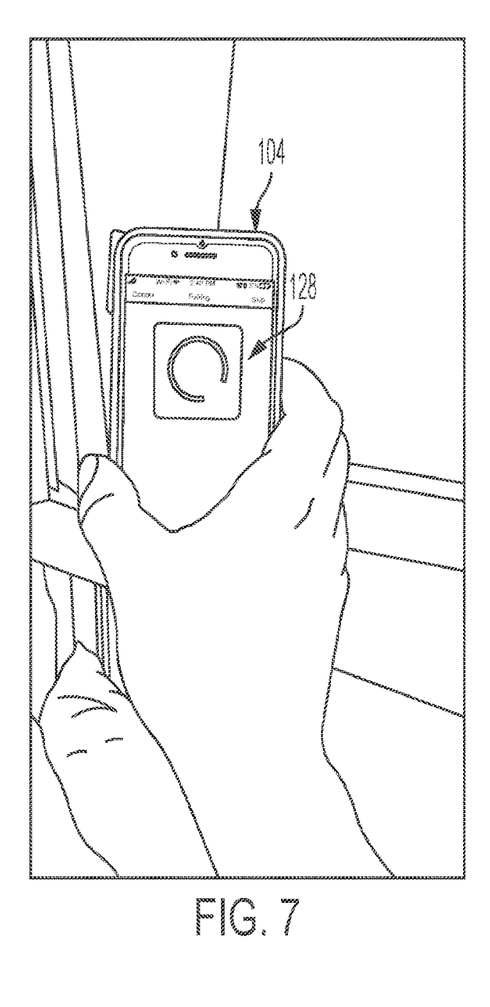
FIG. 7 is a view of the GUI of the smart mobile device showing a pairing processing screen of the smart vehicle software application tool, according to one or more embodiments shown and described herein.

For example, in block 306, with the pairing authenticated through the scan of the QR code in block 304, the software application tool 106 is provisioned with router information of the router 116 from the router file in the cloud (i.e., the network 108 as a cloud network). FIG. 7 depicts a pairing processing screen 128 of the software application tool 106 of the smart mobile device 104. The router information further includes a unique authentication certificate to send to the smart mobile device 104 during the pairing process to pair the software application tool 106 on the smart mobile device 104 with the smart vehicle 102. With submission of the unique authentication certification, related router information in the router file in the cloud is sent to automatically provision the software application tool 106 in the smart mobile device 104 and to provide wireless access from the router 116 installed in the smart vehicle 102 for the smart mobile device 104.

Figure 8:
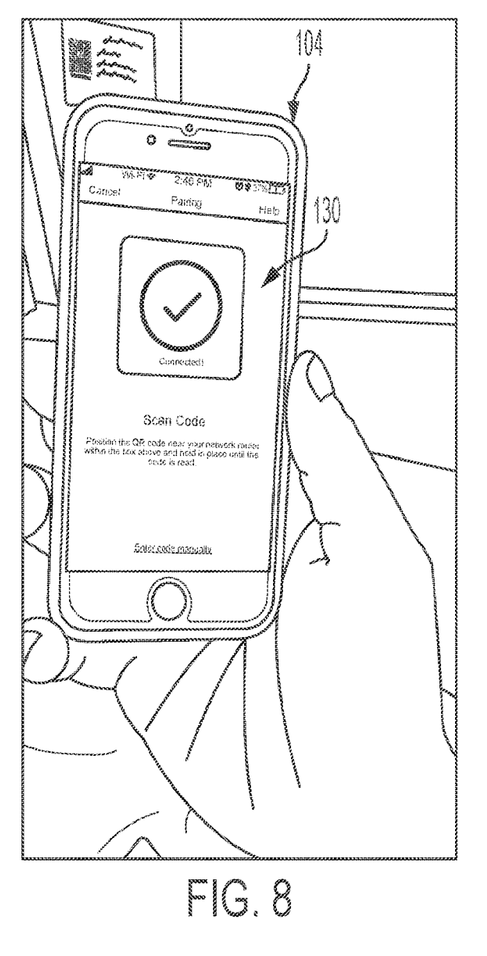
FIG. 8 is a view of the GUI of the smart mobile device showing a pairing confirmation screen of the smart vehicle software application tool, according to one or more embodiments shown and described herein.

Thus, in block 308, the IOT controller 110A of the smart vehicle 102 and the wireless routing of the router 116 installed in and associated with the smart vehicle 102 may be controlled by the software application tool 106 of the smart mobile device 104 paired with the smart vehicle 102. FIG. 8 depicts a pairing confirmation screen 130 of the software application tool 106 on the smart mobile device 104 indicating a successful pairing with the smart vehicle 102. The pairing confirmation screen 130 may further include an option to enter a code manually for pairing and/or instructions for pairing, such as instructions to capture the identification code 114 within a reference frame on the pairing confirmation screen 130 for image capture by the camera of the smart mobile device 104 and processing by the software application tool 106.

By way of example, and not as a limitation, in a pairing mode, the smart mobile device 104 acts as a central device that may scan for data packets advertised by the smart vehicle 102 as a peripheral device, and the code can act as an authentication code for pairing to reject and filter out data packets from devices with which the central device is not interested in communicating. For example, a list of peripheral devices within a signal strength range of the central device may be displayed on a discovered devices list. The peripheral device may be selected from the discovered devices list of the central device, and an encrypted, paired connection may be established between the central device and the peripheral device. With use of scanning of the identification component 114 as described herein by the smart mobile device, a peripheral device need not be manually selected from a listing of peripheral devices within a signal strength range but rather may automatically be selected as the smart vehicle 102 associated with the scanned identification component 114 (e.g., the QR code pre-associated with the smart vehicle 102). Detection of no other user accounts being linked to the unique authentication certificate acts as an authenticator to determine whether the smart device 104 requesting pairing with the smart vehicle 102 is permitted to be provided with the unique authentication certificate. Provision of the unique authentication certification to one user account allows for only one user account to be able to be paired with the smart vehicle 102 at a time.

The pairing authentication and completion results in information download from the router file in the cloud to the software application tool 106, such as SIM identification information, router identification information, a router administration password, and a wireless fidelity access password that is modifiable by a user. The router administration password is configured to be a unique and hidden password associated with, for example, the unique authentication certificate to authenticate the local API of the router 116 prior to pairing of the smart mobile device 104 with the router 116. The unique authentication certificate is configured to be a secure digital key to control the smart vehicle 102 such that only a single user the unique authentication certificate is provided to is able to pair with and control the smart vehicle 102 at a time and until timeout of the unique authentication certificate. For example, a timeout period for the unique authentication certificate may be a short time such as an hour or be for a longer time, such as a few years. For a shorter timeout period, a retailer of the smart vehicle 102 may illustrate the smart capabilities and pairing with the software application tool 106 to a potential buyer. The shorter timeout period may only be available with online access as another limitation. Once the smart vehicle 102 is purchased by buyer, the buyer may download the software application tool 106 and pair with the smart vehicle 102 as described above for a longer timeout period, such as for up to 5 years. After the timeout period associated with the unique authentication certificate is complete, the user will need to repair with the smart vehicle 102 as described above. The longer timeout period may allow the user to be connected with the smart vehicle 102 through the software application tool 106 even when offline such that the user does not have access to the network 108.

Figure 9:
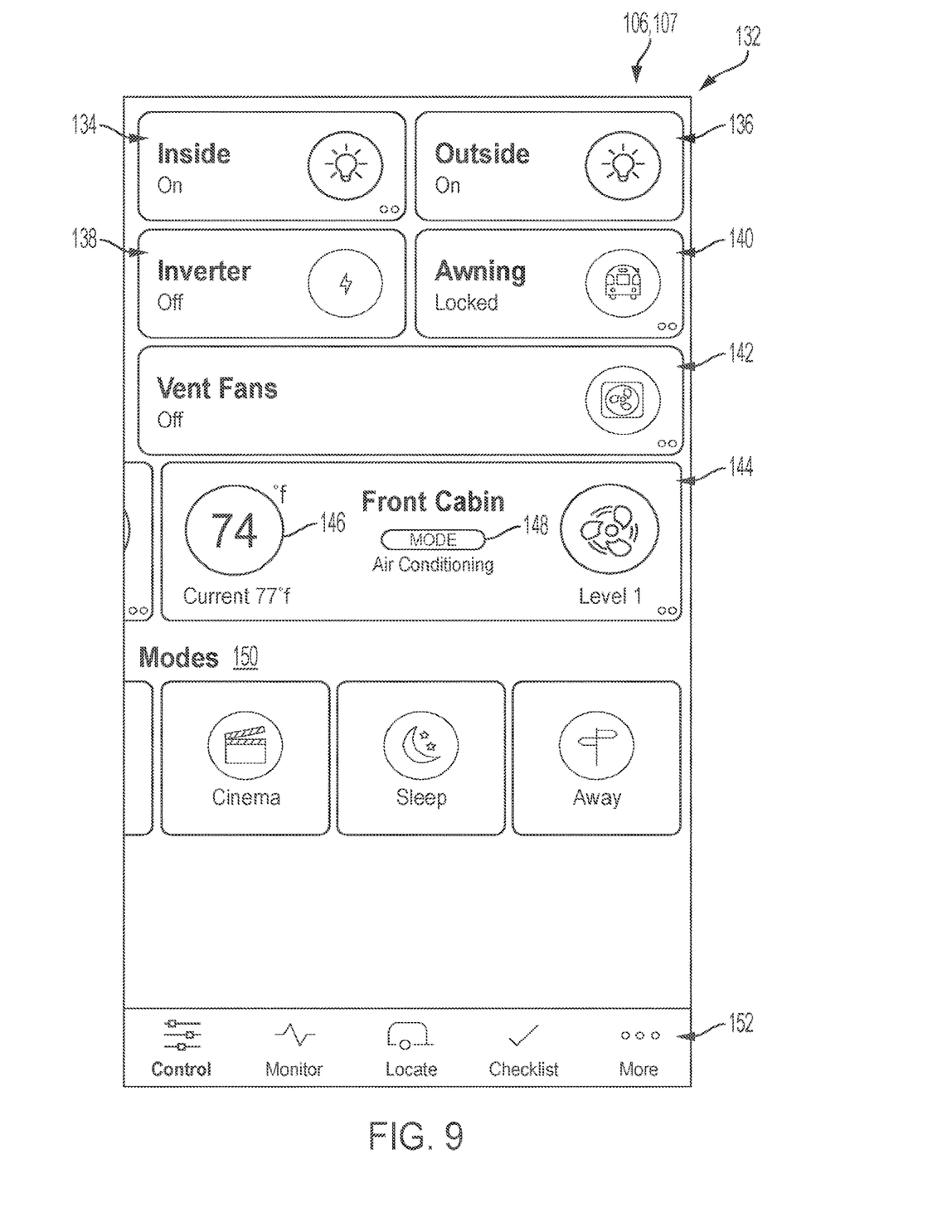
FIG. 9 is a screenshot view of the smart vehicle software application tool after pairing with the smart vehicle and showing a control screen on the smart mobile device configured to control one or more smart vehicle functionalities, according to one or more embodiments shown and described herein.

FIG. 9 depicts a control screen 132 of the software application tool 106 on the display screen 107 of smart mobile device 104 after pairing with the smart vehicle 102. The control screen 132 is configured to control one or more smart vehicle functionalities. The control screen 132 is accessed from the software application tool 106 through selection of a control icon from an options banner 152 at the bottom of the GUI of the software application tool 106 displayed on the display screen 107 of the smart mobile device 104. Other icons in the options banner 152 include a monitor icon to monitor the status of various vehicle subsystems, a locate icon to connect the vehicle with external Global Positioning System (GPS) map data to locate the vehicle with respect to such map data, a checklist icon to provide checklist information associated with the smart vehicle 102, and a more icon for additional icon selections. With respect to the control screen 132, the control screen 132 is configured to control various vehicle functionalities through the IOT controller 110A and/or vehicle controller 110B.

By way of example, and not as a limitation, an Inside button 134 is configured to control the lighting inside the smart vehicle 102, such as turning the lighting on or off or dimming the lighting in different portions of the smart vehicle 102. An Outside button 136 is configured to similarly control the lighting attached outside the smart vehicle 102. An Inverter button 138 is configured to control power associated with running the smart vehicle 102, such as controlling conversion between direct current (DC) and alternating current (AC) for various vehicle subsystems. An Awning button 140 is configured to control whether an awning of the smart vehicle 102 is opened, closed, and/or locked. A Vent Fans button 142 is configured to control whether one or more vent fans of the smart vehicle 102 are on or off (e.g., opened or closed). A Front Cabin button 144 includes additional sub-controls for the front cabin of the smart vehicle 102, such as temperature control through a Temperature button 146, HVAC mode selection through a Mode button 148 (e.g., showing an air condition (AC) mode selection in FIG. 9), and a level of one or more vent fans in the front cabin. Similar buttons may be scrolled to including similar options for other portions of the smart vehicle 102, such as a rear cabin. A Modes 150 section includes additional icons such as for a Cinema control mode to control audiovisual systems of the smart vehicle 102, Sleep control mode to control nighttime settings in the smart vehicle 102, for example, and an Away mode to control away settings for the smart vehicle 102 when the user may be away from the smart vehicle.

The methodologies described herein operate to pair the smart vehicle 102 with the software application tool 106 of the smart mobile device 104, which pairing involves an authenticated smart vehicle pairing such that only a single authorized user account is able to access the smart vehicle 102 through the paired software application tool 106. The router 116 is provided with the first and second identification cards 118, 120, and identification information from the first and second identification cards 118, 120 is uploaded to a router file of the router 116 in the cloud. An API of the software application tool 106 may be utilized to access the uploaded information from the router file in the cloud. The router 116, one or more controllers of the smart vehicle 102, and an identification component 114 placed in the smart vehicle 102 are linked. A user may download the software application tool 106 on the smart mobile device 104, set up a user account, and scan the identification component 114 to associate and pair the smart vehicle 102 with the user account through the software application tool 106. The pairing process further initiates download of information from the router file in the cloud to the software application tool 106 as described herein to, for example, provision the router 116 as a mobile hotspot device configured to provide wireless access for a user. The unique password that is downloaded and invisible to the user, as described herein, unlike a wi-fi password, permits for a one-to-one association between the user account and the smart vehicle 102 such that others may not pair with the smart vehicle 102.

Such an automated data configuration system streamlines and more accurately and effectively adapts digital or data management solutions from a data manager such as the software application tool 106 to the smart vehicle 102 on demand while minimizing dependencies on user involvement and know-how. Based on acceptance by the software application tool 106 as described herein, the software application tool 106 is configured to automatically retrieve data associated with the smart vehicle 102 and to pair the router 116 associated with the smart vehicle 102 with the smart mobile device 104. The user may then utilize the smart mobile device 104 to monitor activity of the smart vehicle 102.

It is noted that recitations herein of a component of the present disclosure being "configured" or "programmed" in a particular way, to embody a particular property, or to function in a particular manner, are structural recitations, as opposed to recitations of intended use. More specifically, the references herein to the manner in which a component is "configured" or "programmed" denotes an existing physical condition of the component and, as such, is to be taken as a definite recitation of the structural characteristics of the component.

It is noted that the terms "substantially" and "about" and "approximately" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A configuration system comprising:
a smart vehicle router associated with router information stored in a router file for the smart vehicle router, the router information including a unique authentication certificate configured to permit a one-to-one pairing such that another pairing is not available once the unique authentication certification is issued;
a smart mobile device comprising a software application tool;
a processor communicatively coupled to the smart mobile device;
a memory communicatively coupled to the processor; and
machine readable instructions stored in the memory, wherein the machine readable instructions cause the configuration system to perform at least the following when executed by the processor
receive information of an identification component associated with the smart vehicle router of a smart vehicle using the software application tool of the smart mobile device, the identification component associated with the router information stored in the router file,
apply an authentication algorithm to the information of the identification component, the authentication algorithm configured to provision the software application tool with the unique authentication certificate,
authenticate the smart vehicle as an authenticated smart vehicle based on the information of the identification component and the authentication algorithm,
pair the authenticated smart vehicle with the software application tool in the one-to-one pairing based on the unique authentication certificate and the router information such that another pairing is not available even when the provisioned software application tool is disconnected from the authenticated smart vehicle and the unique authentication certificate is not available to share with another software application tool, and
automatically configure the software application tool on the smart mobile device to retrieve data associated with the paired authenticated smart vehicle based on the unique authentication certificate.

2. The configuration system of claim 1, wherein the identification component comprises a unique quick response ("QR") code configured to act as a digital key to identify the smart vehicle.

3. The configuration system of claim 2, wherein the unique QR code comprises a unique matrix barcode that includes a machine readable optical label comprising information about the smart vehicle and the router information.

4. The configuration system of claim 2, wherein the machine readable instructions to read the information of the identification component comprises machine readable instructions to scan the unique QR code.

5. The configuration system of claim 1, wherein the smart vehicle is a recreational vehicle ("RV"), and the processor comprises an internet of things (IOT) controller configured to connect, interact with, and exchange data between vehicle subsystems of the RV through an interface control.

6. The configuration system of claim 5, wherein the IOT controller comprises a CZone controller.

7. The configuration system of claim 1, wherein the smart vehicle router comprises a first identification card and a second identification card.

8. The configuration system of claim 7, wherein:
the first identification card is configured for operation with an Internet of Things ("IOT") controller of the authenticated smart vehicle;
the second identification card is configured to operate as an authenticated access point to provide wireless routing through wireless data services from a card services provider; and
the machine readable instructions further cause the configuration system to control the IOT controller of the authenticated smart vehicle and the wireless routing of the authenticated smart vehicle through the software application tool paired with the authenticated smart vehicle.

9. The configuration system of claim 7, wherein:
the first identification card comprises a first subscriber identify module ("SIM") card;
the second identification card comprises a second SIM card; and
uploaded information from the first SIM card and the second SIM card is transmitted through a configuration tool to the router file.

10. The configuration system of claim 9, wherein the uploaded information comprises the router information and identifying SIM information associated with the first SIM card and the second SIM card.

11. The configuration system of claim 7, wherein the first identification card is configured for operation with an Internet of Things ("IOT") controller of the smart vehicle through association with the IOT controller of the smart vehicle to provide technology information, telemetry information, or both.

12. The configuration system of claim 11, wherein the telemetry information comprises vehicle information of the smart vehicle sent for monitoring, tracking, or both of the smart vehicle.

13. The configuration system of claim 7, wherein the second identification card is configured to operate as an authenticated access point to provide wireless data services from a card services provider.

14. The configuration system of claim 1, wherein the software application tool comprises a unique user account configured to pair with the authenticated smart vehicle based on the unique authentication certificate and the router information upon selection of a pair button option of the software application tool.

15. The configuration system of claim 14, wherein the one-to-one pairing with the unique user account expires upon a pairing timeout period.

16. The configuration system of claim 14, wherein the processor further comprises an Internet of Things (IOT) controller of the authenticated smart vehicle, and the retrieved data associated with the authenticated smart vehicle is transmitted by the IOT controller.

17. A configuration system comprising:
a smart vehicle router associated with router information stored in a router file for the smart vehicle router, the router information including a unique authentication certificate configured to permit a one-to-one pairing such that another pairing is not available once the unique authentication certification is issued, the smart vehicle router comprising a first subscriber identify module ("SIM") card and a second SIM card, the first SIM card configured for operation with an Internet of Things ("IOT") controller of the smart vehicle, and the second SIM card configured to operate as an authenticated access point to provide wireless routing;

a smart mobile device comprising a software application tool;

a processor communicatively coupled to the smart mobile device;

a memory communicatively coupled to the processor; and machine readable instructions stored in the memory, wherein the machine readable instructions cause the configuration system to perform at least the following when executed by the processor receive information of an identification component associated with the smart vehicle router of a smart vehicle using the software application tool of the smart mobile device, the identification component associated with the router information stored in the router file, apply an authentication algorithm to the information of the identification component, the authentication algorithm configured to provision the software application tool with the unique authentication certificate, authenticate the smart vehicle as an authenticated smart vehicle based on the information of the identification component and the authentication algorithm, pair the authenticated smart vehicle with the software application tool in the one-to-one pairing based on the unique authentication certificate and the router information such that another pairing is not available even when the provisioned software application tool is disconnected from the authenticated smart vehicle and the unique authentication certificate is not available to share with another software application tool, automatically configure the software application tool on the smart mobile device to retrieve data associated with the paired authenticated smart vehicle based on the unique authentication certificate, and control the IOT controller of the authenticated smart vehicle and the wireless routing of the authenticated smart vehicle through the software application tool paired with the authenticated smart vehicle.

18. The configuration system of claim 17, wherein the first SIM card is configured to operate with the IOT controller of the smart vehicle to provide technology information, telemetry information, or both.

19. The configuration system of claim 18, wherein the telemetry information comprises vehicle information of the smart vehicle sent for monitoring, tracking, or both of the smart vehicle.

20. A method to pair a smart vehicle and a software application tool of a smart mobile device;

the smart vehicle comprising a smart vehicle router associated with router information stored in a router file for the smart vehicle router, the router information including a unique authentication certificate configured to permit a one-to-one pairing such that another pairing is not available once the unique authentication certification is issued, the method comprising:

receiving information of an identification component associated with the smart vehicle router of the smart vehicle using the software application tool of the smart mobile device, the identification component associated with the router information stored in the router file, applying an authentication algorithm to the information of the identification component, the authentication algorithm configured to provision the software application tool with the unique authentication certificate, authenticating the smart vehicle as an authenticated smart vehicle based on the information of the identification component and the authentication algorithm, pairing the authenticated smart vehicle with the software application tool in the one-to-one pairing based on the unique authentication certificate and the router information such that another pairing is not available even when the provisioned software application tool is disconnected from the authenticated smart vehicle and the unique authentication certificate is not available to share with another software application tool, and automatically configuring the software application tool on the smart mobile device to retrieve data associated with the paired authenticated smart vehicle based on the unique authentication certificate.

* * * * *